US006287725B1

(12) United States Patent
Maeda et al.

(10) Patent No.: US 6,287,725 B1
(45) Date of Patent: Sep. 11, 2001

(54) SINTERED HYDROGEN STORAGE ALLOY ELECTRODE AND NICKEL-HYDROGEN STORAGE BATTERY

(75) Inventors: Reizo Maeda, Moriguchi; Syuuichi Suzuki, Hirakata; Hiroshi Nakamura, Neyagawa; Mitsuzo Nogami, Tokushima; Ikuo Yonezu; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/402,234

(22) PCT Filed: Mar. 26, 1998

(86) PCT No.: PCT/JP98/01425

§ 371 Date: Feb. 1, 2000

§ 102(e) Date: Feb. 1, 2000

(87) PCT Pub. No.: WO98/44577

PCT Pub. Date: Oct. 8, 1998

(30) Foreign Application Priority Data

Feb. 4, 1999 (JP) ................................. H9-099676

(51) Int. Cl.⁷ ..................................... H01M 4/58
(52) U.S. Cl. ...................... 429/218.2; 429/217; 429/233; 429/245
(58) Field of Search ................... 429/218.2, 217, 429/231.8, 218.1, 233, 245

(56) References Cited

U.S. PATENT DOCUMENTS

| 5,032,475 | * | 7/1991 | Hasebe et al. | 429/60 |
| 5,340,670 | * | 8/1994 | Takami et al. | 429/218.1 |
| 5,753,386 | * | 5/1998 | Inaba et al. | 429/101 |
| 6,197,448 | * | 3/2001 | Gaydos et al. | 429/218.2 |

FOREIGN PATENT DOCUMENTS

| 3-173062 | * | 7/1991 | (JP) . |
| 4-082162 | * | 3/1992 | (JP) . |
| 4-249067 A | | 9/1992 | (JP) . |
| 4-328251 A | | 11/1992 | (JP) . |
| 5-47374 A | | 2/1993 | (JP) . |
| 5-62676 A | | 3/1993 | (JP) . |
| 5-258750 A | | 10/1993 | (JP) . |
| 6-163044 A | | 6/1994 | (JP) . |
| 8-88000 A | | 4/1996 | (JP) . |

* cited by examiner

Primary Examiner—Laura Weiner
(74) Attorney, Agent, or Firm—Kubovcik & Kubovcik

(57) ABSTRACT

The present electrode is fabricated by coating a conductive substrate with a paste including a hydrogen-absorbing alloy, a binder and a carbon material and sintering the conductive substrate coated with the paste under vacuum or in an atmosphere of a non-oxidizing gas. In this electrode, the carbon material works as a reducing agent so as to suppress oxidation of the hydrogen-absorbing alloy during the sintering, and therefore, the electrode exhibits large oxygen absorbing power in over-charge. Furthermore, the present battery uses, as a negative electrode, the sintered hydrogen-absorbing alloy electrode exhibiting large oxygen absorbing power in over-charge, and hence attains high reliability because increase of the pressure within the battery is minimal.

7 Claims, No Drawings

SINTERED HYDROGEN STORAGE ALLOY ELECTRODE AND NICKEL-HYDROGEN STORAGE BATTERY

TECHNICAL FIELD

The present invention relates to a sintered hydrogen-absorbing alloy electrode used as a negative electrode in an alkaline storage battery.

BACKGROUND ART

In accordance with recent spread of cordless equipment, there are rapidly increasing demands for secondary batteries. In particular, a nickel-metal hydride storage battery, which has a higher energy density than a nickel-cadmium storage battery and a lead storage battery, is regarded as a noticeable power source for an electric vehicle and the like.

A nickel-metal hydride storage battery uses a hydrogen-absorbing alloy electrode as a negative electrode and a nickel electrode as a positive electrode, and is designed to have a positive electrode capacity smaller than a negative electrode capacity. Thus, an oxygen gas generated from the positive electrode in over-charge is absorbed by the negative electrode so that the pressure within the battery can be prevented from increasing. Accordingly, the pressure within the battery can be prevented from increasing even when the battery is over-charged as far as the oxygen gas is rapidly absorbed by the negative electrode.

As the hydrogen-absorbing alloy electrode, any of various electrodes including a pasted electrode, a foamed metal electrode and a sintered electrode can be used. A pasted electrode is fabricated by shaping a punching metal coated with a hydrogen-absorbing alloy and a binder. A foamed metal electrode is fabricated by shaping a spongy conductive substrate coated with a hydrogen-absorbing alloy and a binder. A sintered electrode is fabricated by sintering a conductive substrate, such as a punching metal, coated with a hydrogen-absorbing alloy and a binder. The pasted electrode and the foamed metal electrode, which are not sintered, are poor at oxygen absorbing power because the binder prevents the hydrogen-absorbing alloy from absorbing oxygen.

In contrast, in the sintered electrode, almost all the binder is lost through decomposition during the sintering, and hence, the binder never prevents the hydrogen-absorbing alloy from absorbing oxygen. However, when an oxygen-containing binder (a binder including an oxygen atom in its molecule) or a binder aqueous solution (a water soluble binder dissolved in water) is used as a binder, which includes oxygen which oxidizes the alloy, the hydrogen-absorbing alloy is unavoidably oxidized during the sintering. Accordingly, development of a sintered hydrogen-absorbing alloy electrode with large oxygen absorbing power is significant for obtaining a highly reliable battery in which increase of the pressure is minimal.

The present invention was devised under these circumstances, and an object is providing a sintered hydrogen-absorbing alloy electrode exhibiting large oxygen absorbing power and a highly reliable nickel-metal hydride storage battery using the same.

DISCLOSURE OF INVENTION

The method of fabricating a sintered hydrogen-absorbing alloy electrode (the present method) comprises the steps of:

coating a conductive substrate with a paste in which a rare earth-nickel hydrogen-absorbing alloy having a $CaCu_5$ structure, an oxygen-containing binder or a water-soluble binder, and a carbon material are dispersedly mixed; and sintering the conductive substrate coated with the paste under vacuum or in an atmosphere of a non-oxidizing gas.

Any of known hydrogen-absorbing alloys for alkaline storage batteries can be used as the hydrogen-absorbing alloy, and a spherical alloy obtained by an atomizing method is preferably used in order to attain a uniform density distribution of alloy particles in a sintered substance. Apart from the hydrogen-absorbing alloy obtained by the atomizing method, a granulated alloy obtained by grinding a hydrogen-absorbing alloy prepared by cast molding; a hydrogen-absorbing alloy prepared by a roll quenching method in which a melted hydrogen-absorbing alloy is dropped onto a rotating roll; and a hydrogen-absorbing alloy obtained by grinding the hydrogen-absorbing alloy prepared by the roll quenching method can be used. Examples of kinds of the hydrogen-absorbing alloy are those conventionally used for alkaline storage batteries, such as a rare earth-nickel hydrogen-absorbing alloy having a $CaCu_5$ structure, typically $LaNi_5$; a hydrogen-absorbing alloy having a Laves structure; and a hydrogen-absorbing alloy having a BCC structure. Among these known hydrogen-absorbing alloys, a rare earth-nickel hydrogen-absorbing alloy represented by $MmNi_aCo_bAl_cMn_d$ (wherein $2.0 \leq a \leq 5.0$, $0.1 \leq b \leq 3.0$, $0.1 \leq c \leq 2.0$, $0.1 \leq d \leq 2.0$, $4.5 \leq a+b+c+d \leq 5.5$, and Mm indicates a mixture of rare earth elements) is preferred. The particle size of the hydrogen-absorbing alloy is not herein specified, but when the particle size is too large, formation of the electrode is difficult because the hydrogen-absorbing alloy cannot be uniformly rolled and coated over the conductive substrate. On the contrary, when the particle size is too small, the proportion of oxide is increased because the oxide of the hydrogen-absorbing alloy is formed on the particle surface. Therefore, the hydrogen-absorbing alloy preferably has a particle size of approximately 10 through 200 $\mu$m.

The binder is an oxygen-containing binder or water-soluble binder. In a conventional sintered electrode, the alloy is oxidized in the sintering when an oxygen-containing binder or a binder aqueous solution is used. In this invention, however, since the paste includes the carbon material, the alloy is remarkably suppressed from degrading through the oxidation during the sintering owing to a reducing function of the carbon material. Accordingly, when an oxygen-containing binder or a water-soluble binder is used as the binder, the effect of the invention is remarkably exhibited. Examples of the oxygen-containing binder are polyamide, polycarbonate, poly(methyl methacrylate), polyurethane, a phenol resin, silicone and poly(acrylic acid), and examples of the water-soluble binder are poly(ethylene oxide), poly (vinyl alcohol), poly(vinylpyrrolidone), hydroxypropyl cellulose, carboxymethyl cellulose and methyl cellulose.

Examples of the carbon material are graphite (natural graphite and artificial graphite), coke (oil coke and coal pitch coke), non-graphitizable carbon (such as glassy carbon), amorphous carbon (such as carbon black, acetylene black and Ketchen black). In using a carbon material in which volumetric shrinkage thereof or a side reaction derived from an impurity included therein can be caused during the sintering, the carbon material is preferably previously heated at a temperature higher than a sintering temperature so as to prevent the volumetric shrinkage or the side reaction, thereby suppressing deformation of the electrode as far as possible. Through this heat treatment, the carbon material is crystallized so as not to largely shrink during the sintering and the impurity included therein is removed. Examples of a carbon material that is difficult to shrink during the sintering are natural graphite, and a carbon material with a lattice spacing ($d_{002}$) between lattice planes (002) of 0.345 nm or less obtained by heating graphitizable carbon at 1300° C. or more, and preferably 2000° C. or more.

Examples of the conductive substrate are a punching metal, a foamed metal, a lath board, a metallic fiber non-woven fabric, and a corrugated board made from a corrugated substrate with irregularities formed thereon. When the conductive substrate is a punching metal or a lath board functioning as a two-dimensional current collector, the thickness is preferably approximately 0.01 through 0.1 mm, and when it is a foamed metal, a metallic fiber nonwoven fabric or a corrugated board functioning as a three-dimensional current collector, the thickness is preferably 0.5 through 2 mm.

The paste preferably includes the carbon material in a ratio of 0.1 through 20 wt % based on the total amount of the hydrogen-absorbing alloy, the oxygen-containing binder or a water-soluble binder and the carbon material. When the amount of the carbon material is out of this range, the oxygen absorbing power of the electrode is lowered.

The sintering for preparing the present electrode is conducted at a temperature at which the hydrogen-absorbing alloy can be sintered and keep the form as an electrode. Specifically, when a rare earth-nickel hydrogen-absorbing alloy is used, the sintering is conducted preferably at approximately 600 through 1200° C. for the following reason: When the sintering temperature is lower than 600° C., it takes a long time for the hydrogen-absorbing alloy particles to sufficiently weld together, and when the sintering temperature exceeds 1200° C., a part of components of the hydrogen-absorbing alloy is evaporated, resulting in changing the composition. In particular, the sintering is conducted more preferably at 700 through 1000° C. because the aforementioned problems can be avoided in this temperature range. When the sintering is conducted under vacuum or in an atmosphere of a non-oxidizing gas, the oxidation of the hydrogen-absorbing alloy can be suppressed. Examples of the non-oxidizing gas are a hydrogen gas, an argon gas, a nitrogen gas and a mixture of these gases.

The carbon material functions as a reducing agent for suppressing the oxidation of the hydrogen-absorbing alloy during the sintering. In addition, the carbon material functions not only as a conducting agent for improving the conductivity of the electrode but also as a reduction catalyst in the oxygen absorbing reaction. Since the carbon material added to the paste in the preparation of the electrode has such various functions, the present electrode can exhibit large oxygen absorbing power.

PREFERRED EMBODIMENTS

The present invention will now be described in detail on the basis of preferred embodiments thereof, and it is noted that the invention is not limited to the following embodiments but can be practiced with appropriate modification without departing from the scope of the invention.

Embodiment 1

A spherical alloy (having a particle size of 35 through 150 $\mu$m) represented by a composition formula $MmNi_{3.2}CoAl_{0.2}Mn_{0.6}$ was obtained by a conventionally known gas atomizing method. Water was added to 94.5 parts by weight of the spherical alloy, 0.5 part by weight of poly(ethylene oxide) and 5 parts by weight of artificial graphite (with a bulk density of 0.6 g/cm$^3$), and the resultant was kneaded into a paste. Then, a punching metal (a conductive substrate) of nickel was inserted into the paste, and the resultant paste was dried, thereby preparing a pasted electrode. The pasted electrode was sintered under vacuum for 8 hours at 900° C. Thus, a sintered hydrogen-absorbing alloy electrode A (electrode according to the present invention) was prepared.

COMPARATIVE EXAMPLE 1

A pasted hydrogen-absorbing alloy electrode B (electrode according to the comparative method) was prepared in the same manner as in Embodiment 1 except that the sintering was not conducted.

COMPARATIVE EXAMPLE 2

A sintered hydrogen-absorbing alloy electrode C (electrode according to the comparative method) was prepared in the same manner as in Embodiment 1 except that artificial graphite was not included in the paste.

<Fabrication of batteries>

Each of the above-described electrodes (as a negative electrode) and a conventionally known sintered nickel electrode (as a positive electrode) were spirally wound with a polyolefin nonwoven fabric (as a separator) sandwiched therebetween, thereby fabricating a spiral electrode body. This spiral electrode body was housed in a cylindrical battery can. Thus, AA size sealed nickel-metal hydride storage batteries A, B and C having a theoretical capacity of 1 Ah were fabricated. The batteries A, B and C respectively use the hydrogen-absorbing alloy electrodes A, B and C. As an electrolyte, 2.4 g of a potassium hydroxide aqueous solution in a concentration of 8 mole/liter was used.

<Pressure within batteries after over-charge>

Each of the batteries was charged with 1 A for 1.5 hours, and the pressure within the battery was measured. The pressure was measured with a pressure sensor inserted through a hole formed on the bottom of the battery can. The results are shown in Table 1.

TABLE 1

| Battery | Pressure within battery (kg/cm$^2$) |
|---|---|
| A | 9.1 |
| B | 17.2 |
| C | 13.8 |

The pressure within the battery after over-charge is much lower in the battery A than in the batteries B and C. This is because the surface of the hydrogen-absorbing alloy is neither covered with the binder nor oxidized in the battery A, and hence an oxygen gas is rapidly absorbed by the negative electrode during the over-charge. Another reason for the lower pressure seems that the artificial graphite is dispersed in the entire electrode so as to improve the current collecting property. In the battery B, the pressure is increased up to approximately 18 kg/cm$^2$, at which a general safety valve is actuated. Therefore, when the charge is further continued, the safety valve can be actuated to cause problems of leakage and the like. The pressure within the battery B is thus very high because the surface of the hydrogen-absorbing alloy is covered with the binder and hence an oxygen gas cannot be rapidly absorbed by the negative electrode during the over-charge. The pressure within the battery C is high because the paste includes no carbon material and hence the hydrogen-absorbing alloy is degraded through oxidation during the sintering and because the conductivity of the electrode is not sufficiently high.

<Relationship between amount of carbon material and pressure within battery>

Sintered hydrogen-absorbing alloy electrodes X1 through X9 and sealed nickel-metal hydride storage batteries X1 through X9 were fabricated in the same manner as in Embodiment 1 except that the amount of the carbon material (artificial graphite) is respectively changed as listed in Table 2. The pressure within each battery was measured in the same manner as described above. The results are shown in Table 2. Table 2 also shows the results of the battery A listed in Table 1.

TABLE 2

| Battery | Amount of carbon material (wt %) | Pressure within battery (kg/cm$^2$) |
|---|---|---|
| X1 | 0.05 | 13.6 |
| X2 | 0.1 | 12.0 |
| X3 | 0.2 | 10.0 |
| X4 | 0.5 | 9.1 |
| X5 | 1 | 8.7 |
| X6 | 2 | 8.6 |
| A | 5 | 9.1 |
| X7 | 10 | 10.0 |
| X8 | 20 | 12.0 |
| X9 | 50 | 17.8 |

It is understood from Table 2 that the amount of the carbon material to be included in the paste is preferably 0.1 through 20 wt % and more preferably 0.2 through 10 wt % based on the total amount of the hydrogen-absorbing alloy, the binder and the carbon material. The battery X1 including a small amount of the carbon material has a high pressure after the over-charge because oxidation of the hydrogen-absorbing alloy is insufficiently suppressed by the carbon material. The pressure within the battery X9 including a large amount of the carbon material is very high because the amount of the hydrogen-absorbing alloy is decreased as the amount of the carbon material is increased, and hence, the negative electrode capacity is decreased. Therefore, the negative electrode is fully charged during the over-charge, and hence a hydrogen gas is generated.

INDUSTRIAL APPLICABILITY

The present method enables fabrication of a sintered hydrogen-absorbing alloy electrode exhibiting large oxygen absorbing power during over-charge because the carbon material works as a reducing agent for suppressing oxidation of the hydrogen-absorbing alloy during sintering.

What is claimed is:

1. A method of fabricating a sintered hydrogen-absorbing alloy electrode comprising the steps of:

coating a conductive substrate with a paste in which a rare earth-nickel hydrogen-absorbing alloy having a CaCu$_5$ structure, an oxygen-containing binder or a water-soluble binder, and a carbon material having a lattice spacing ($d_{002}$) between lattice planes (002) of 0.345 nm or less are dispersedly mixed; and sintering the conductive substrate coated with the paste under vacuum or in an atmosphere of non-oxidizing gas.

2. A method of fabricating a sintered hydrogen-absorbing alloy according to claim 1, wherein the paste includes the carbon material in ratio of 0.1 through 20 wt. % based on a total amount of the hydrogen-absorbing alloy, the binder and the carbon material.

3. A method of fabricating a sintered hydrogen-absorbing alloy electrode according to claim 1, wherein the hydrogen-absorbing alloy is a spherical alloy prepared by an atomizing method.

4. A method of fabricating a sintered hydrogen-absorbing alloy according to claim 1, wherein the conductive substrate is a punching metal, a foamed metal, a lath board, a metallic fiber nonwoven fabric or a corrugated board made from a metal.

5. A method of fabricating a sintered hydrogen-absorbing alloy electrode according to claim 1, wherein the conductive substrate is sintered at 600 through 1200° C.

6. A method of fabricating a sintered hydrogen-absorbing alloy electrode according to claim 1, wherein the conductive substrate is sintered at 700 through 1000° C.

7. A method of fabricating a sintered hydrogen-absorbing alloy electrode according to claim 1, wherein the rare earth-nickel hydrogen-absorbing alloy having a CaCu$_5$ structure is a bare hydrogen-absorbing alloy.

* * * * *